E. G. REYNOLDS, F. D. WARREN & E. C. JOHNSON.
J. A. RITTER, JR., ADMINISTRATOR OF E. G. REYNOLDS, DEC'D.
PEDAL FOR MOTOR CYCLES.
APPLICATION FILED FEB. 14, 1916.

Reissued Apr. 11, 1916. 14,107.

Witness:
Jas. E. Hutchinson:

Elmer C. Johnson Inventors
Elmer G. Reynolds, Deceased
By John Alfred Ritter, Jr. Administrator,
Frank D. Warren
By Bacon & Milans, Attorneys:

THE COLUMBIA PLANOGRAPH CO., WASHINGTON, D. C.

UNITED STATES PATENT OFFICE.

ELMER G. REYNOLDS, DECEASED, LATE OF COLORADO SPRINGS, COLORADO, BY JOHN ALFRED RITTER, JR., ADMINISTRATOR, OF COLORADO SPRINGS, COLORADO, FRANK D. WARREN, OF COLORADO SPRINGS, COLORADO, AND ELMER C. JOHNSON, OF SANTA BARBARA, CALIFORNIA, ASSIGNORS TO THE WESTERN MOTORCYCLE PEDAL CO., A CORPORATION OF COLORADO.

PEDAL FOR MOTOR-CYCLES.

14,107. Specification of Reissued Letters Patent. Reissued Apr. 11, 1916.

Original No. 1,087,258, dated February 17, 1914, Serial No. 773,701. Application for reissue filed February 14, 1916. Serial No. 78,313.

*To all whom it may concern:*

Be it known that ELMER G. REYNOLDS, deceased, formerly a citizen of the United States, a resident of Colorado Springs, in the county of El Paso, State of Colorado, FRANK D. WARREN, a citizen of the United States, and a resident of Colorado Springs, in the county of El Paso, State of Colorado, and ELMER C. JOHNSON, a citizen of the United States, residing at Santa Barbara, county of Santa Barbara, State of California, have invented a new and useful Improvement in Pedals for Motor-Cycles, of which the following is a full, clear, and exact description, reference being had to the accompanying drawings.

The invention relates more particularly to an improved pedal structure designed for use in connection with cycles, and especially motorcycles.

Since the ordinary pedal now in use on motor and other cycles is subject to breakage and damage when the machine falls thereon, it is an object of the present invention to provide a pedal that will fold up under the weight of the falling machine and thus prevent the breaking, bending or damaging of the crank or pedal parts.

Another object of the invention is the provision of a pedal which will not be damaged when the machine is in motion and the pedal comes in contact with curbs, rocks or other surface obstructions.

A further object of the invention is to provide a pedal structure which will serve as a shock absorber when the pedal collides with a stationary object; a pedal of the pivoted type which will normally maintain its proper operative position one which will be so constructed as to present a full width tread portion and which will possess novel characteristics and features presently to be described.

Figure 1:
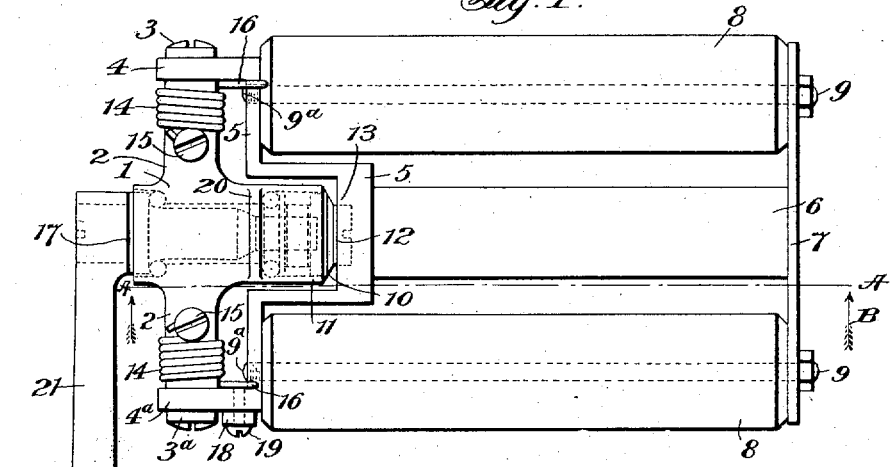
Figure 2:
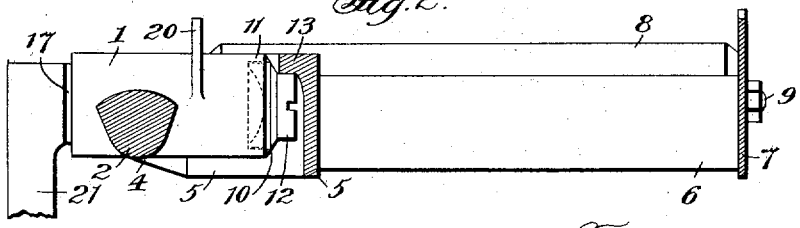
Figure 4:
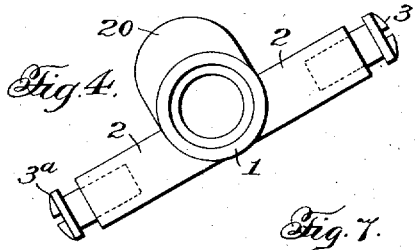
Figure 3:
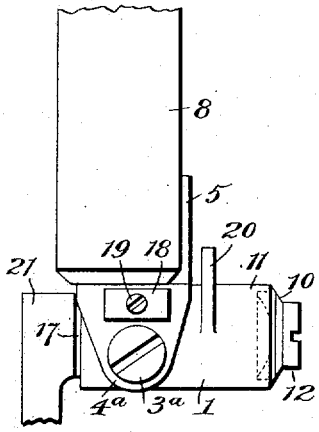
Figure 5:
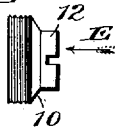
Figure 6:
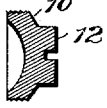
Figure 7:
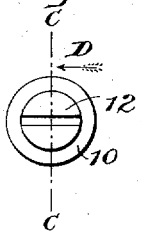

Referring to the drawings, in all the figures of which like characters of reference designate like parts: Figure 1 is an elevation view of the hinged pedal and crank; Fig. 2 is a sectional view of the pedal taken on the line A—A, Fig. 1, looking in the direction of arrow B, together with a fragmental portion of the crank; Fig. 3 shows a fragmental portion of the pedal turned upward illustrating the hinged parts. A fragmental portion of the crank is also shown; Fig. 4 is an end view of the hub of the pedal other parts being removed, and shows the arms which serve as pivots for the hinged portion of the pedal; Fig. 5 is a side elevation of the plug in the outer end of the hub. The outwardly projecting portion of this lug serves as a stop for the frame of the hinged portion. Fig. 6 shows a sectional view of the plug taken on the line C—C, in Fig. 7, looking in the direction of arrow D, and, Fig. 7 shows an end view of the plug looking in the direction of arrow E, in Fig. 5.

The improved pedal comprises a hub 1 with two laterally extending arms 2 integral therewith, the outer ends of said arms being provided with screw pins 3, $3^a$, upon which the ends 4, $4^a$, of the yoke 5, are pivoted. A piece of tubing 6 connects the yoke 5 with the end plate 7, forming a rigid frame to support the rubber treads 8 which are mounted upon tread pins 9 in the usual way. The inner ends $9^a$ of the said tread pins 9 are screw-threaded and are secured in holes tapped in the said yoke 5.

A screw plug 10 closes the outer end 11 of the hub 1 and the boss 12 of the plug 10 affords a support for the flange 13 of the yoke 5 of the hinged portion of the pedal.

Springs 14 are mounted upon the arms 2 and are secured thereto by means of screws 15 and the ends of the said springs engage the yoke 5 and are adapted to return the pedal to its normal position when it has, for any reason, been folded back or turned upward, as illustrated in Fig. 3.

Since it is possible for the pedal to fold in one direction only, it is desirable that the side on which the pedal folds should remain uppermost in order that the foot may not be placed upon the wrong side and fold the pedal backward, and to accomplish this certain parts of the pedal, namely, the arms 2, screw pins 3, $3^a$, yoke 5, tubing 6, springs 14, and end plate 7, are placed with their centers of gravity below the axial plane of the spindle 17 upon which the hub 1 rotates, thus causing the pedal upon being freed, to gravitate to the desired position.

The rear end 4ª of the yoke 5, is weighted by means of a weight 18, secured by a screw 19, and has for its object the tilting of the pedal rearward at approximately the angle indicated in Fig. 4 in order that collision with any obstacle may throw the pedal rearward and upward and avoid breakage. The forward end 4 of the yoke 5 is also tapped to receive the screw 19 in order to secure the weight 18, making the pedals and parts interchangeable.

The inner foot guard 20 is saddled and brazed upon the hub 1. The spindle 17 is secured to the crank 21 in the usual manner.

It will be noted from the above description that the form of pedal provided is one wherein the springs normally and forcibly return the pedal to its active or service position after pressure has been taken from the under side thereof, and that the spring pressure firmly holds the pedal in position against rattling or independent vibration. It will also be observed that when the motorcycle or machine tips or falls sidewise, the collapsing action of the pedal against the spring pressure tends to absorb the shock, and thus prevent damage to the machine and parts thereof, as well as preventing the bending or breaking of the pedal parts. By carrying the foot guard 20 well back on the hub and the yoke part 5 forward, as shown in Fig. 1, the treads 8 may be of the conventional length and thereby render the pedal as a whole of a length or foot width the same as the conventional or accepted standard length of pedal.

It is of course to be understood that various changes, modifications and alterations can be made in and to the invention without departing from the general nature and principle thereof.

Having thus described the invention, what is claimed is:

1. In a hinged pedal adapted to fold up when colliding with an obstruction all available parts so disposed as to place a preponderance of weight on the lower side of said pedal and maintain a constant balance thereof, means for tilting said pedal, means for returning the hinged portion of the said pedal to normal position when deflected therefrom.

2. In a pedal of the class described, a hub, a spindle in said hub, arms extending laterally from said hub, pivots on said arms and a yoke adapted to swing on said pivots, said yoke adapted to form a part of the frame of the hinged portion of the pedal, a screw plug in the outer end of the said hub, a boss projecting outwardly on the said plug and adapted to form a support for the hinged portion of the pedal.

3. In a pedal of the class described, a hub and a spindle in said hub, arms extending laterally from said hub, a yoke adapted to be pivoted to said arms, a plug in the end of the said hub and a boss on the said plug, a flange on the said yoke adapted to engage the said boss and support the swinging portion of the pedal, springs mounted upon the said arms, said springs adapted to engage the said yoke and exert a downward pressure thereon.

4. In a hinged pedal adapted to fold up when colliding with an obstacle, a hub, arms on said hub, a yoke adapted to be pivoted upon said arms, a support on the outer end of said hub, a flange on said yoke engaging said support, a piece of tubing secured in a suitable manner to the said yoke and adapted to support the end plate.

5. In a hinged pedal adapted to fold up when colliding with an obstacle, a hub, arms on said hub, a yoke adapted to be pivoted upon said arms, means for supporting said yoke, a frame, tread pins mounted in said frame, the inner ends of said tread pins screw threaded and adapted to be secured in holes in the said yoke, holes tapped in the said yoke and adapted to receive the inner ends of the said tread pins, the inner foot guard mounted upon the said hub and secured thereto.

6. In a motorcycle pedal, means adapting said pedal to fold up when the machine falls thereon, and means for extending the folding portion of said pedal to normal position when released, means for balancing said pedal upon its spindle, and means for maintaining said pedal in an inclined position upon its axis.

7. In a hinged pedal adapted to fold up when colliding with an obstruction, parts thereof being so disposed as to place a preponderance of weight on the lower side of the pedal to maintain it in constant balance with the tread surface presented uppermost, and means for positively returning the pedal to normal position after deflection.

8. In a hinged pedal adapted to fold up when colliding with an obstruction, parts thereof being so disposed as to place a preponderance of weight on the lower side thereof for maintaining the tread surface uppermost, means permitting tilting of said pedal, and spring means for returning the pedal to its normal service position after deflection.

9. In a bicycle pedal, means adapting said pedal to fold up when the machine falls thereon, means for forcing said pedal to service position when released, and means for balancing said pedal upon its spindle whereby the upper surface of the pedal is at all times presented for service.

10. In a cycle pedal and in combination with the crank member, a pedal, means adapting said pedal to fold up when the machine falls thereon, means for returning and maintaining the pedal in normal operative position, and means for normally maintaining the tread surfaces of the pedal upwardly disposed.

11. In a pedal for cycles, means adapting said pedal to fold upward when meeting obstruction, and a spring for normally retaining the pedal in operative position.

12. In a pedal for cycles, means for hingedly mounting the same for upward deflection, and means for positively returning and retaining the pedal in operative position.

13. A hinged pedal adapted to fold up when colliding with an obstruction and provided with means for maintaining the tread surfaces upwardly disposed with means for positively returning the pedal from folded position to normal position and for retaining it in said normal position.

14. In a pedal for cycles and the like, means for hingedly mounting the same for upward deflection, and means for positively and yieldingly retaining the pedal in operative position.

15. In a folding pedal, the combination with a crank, a spindle part and a hub part, of a pedal member having a tread surface inwardly and outwardly beyond the end of the hub part, a hinged connection between the pedal and the hub part and means for retaining the pedal at right angles to the crank when in serivce position.

16. In a pedal, the combination with a frame member, a hub member, a pivotal connection between the frame member and the hub member, a spring carried by the hub member and engaging the frame member, and a stop for limiting the movement of the frame member in one direction.

17. In a hinged pedal structure, a hub part and a foot engaging part, a hinged connection between the parts, and a transverse member carried by the foot engaging part and positioned to engage the hub part when the pedal is in its operative position.

18. In a pedal for cycles, the combination with a hub part, of a pedal part extending outwardly beyond the hub part for a major portion of its length, a hinged connection between the pedal part and the hub part, and means between the parts for holding the pedal in operative position.

In testimony whereof, we have hereunto set our hands this 1st day of February, 1916.

JOHN ALFRED RITTER, Jr.,
*Administrator of the estate of Elmer G. Reynolds, deceased.*

FRANK D. WARREN.

Witnesses:
Robt. G. Argo,
S. J. Walker.

In testimony whereof, I have hereunto set my hand this 7th day of February, 1916.

ELMER C. JOHNSON.

Witnesses:
S. J. Walker,
E. E. Hauser.

Copies of this patent may be obtained for five cents each, by addressing the "Commissioner of Patents, Washington, D. C."